Feb. 2, 1971  J. A. MAUDLIN ET AL  3,559,366
CARTON LOADING APPARATUS AND METHOD
Filed Nov. 29, 1968  3 Sheets-Sheet 3

INVENTOR.
JERRY A. MAUDLIN
CARL K. BARNES
BY James V. Harman
ATTORNEY

United States Patent Office 3,559,366
Patented Feb. 2, 1971

3,559,366
CARTON LOADING APPARATUS AND METHOD
Jerry A. Maudlin, Pekin, Ind., and Carl K. Barnes, Lodi, Ohio, assignors to The Pillsbury Company, Minneapolis, Minn., a corporation of Delaware
Filed Nov. 29, 1968, Ser. No. 780,072
Int. Cl. B65b 5/04
U.S. Cl. 53—35                                      6 Claims

ABSTRACT OF THE DISCLOSURE

A carton loading machine consisting of two parallel conveyors mounted one above the other. Articles that are to be inserted in containers are loaded on carriers provided on the upper conveyor. Receptacles advanced by the lower conveyor are positioned in vertical alignment with the carriers on the upper conveyor. The articles in the upper carriers are supported by and slide along a fixed bar which extends the length of the apparatus between the conveyors. The carriers of the upper conveyor are mounted for lateral sliding movement. A cam on the framework forces the upper carriers laterally so that the articles upon clearing the side of the bar fall into the cartons.

---

The present invention relates to container loading equipment and more particularly to an apparatus for rapidly loading articles into containers as the containers move from one location to another.

Of the numerous prior devices used for loading containers, many have operated at relatively low speed and are poorly suited for reliably filling a receptacle (e.g. a carton) with an article that is precisely the same length as the inside dimension of the container.

Another problem associated with prior loading equipment is an inability to accommodate for a missing carton in the event one of the cartons for some reason happens to be absent at the point where it is to be loaded. Other carton filling equipment of the general type described requires a complicated intermittent drive mechanism or occupies a relatively large amount of floor space. A further shortcoming of many prior devices of the general type described is their inability to allow quick changes in the size of the articles being loaded.

In view of these and other shortcomings of the prior art, the invention has the following general objectives and advantages: (a) the ability to continuously fill moving containers at a relatively high speed, e.g. 250 containers per minute; (b) the ability to reliably fill cartons with an article having the same length as the inside dimension of the carton; (c) a provision to prevent the transfer of articles from a loading station if a carton is missing at the point where the article is to be inserted; (d) the provision of an apparatus which is relatively simple in construction, reliable in operation, economical to manufacture and occupies relatively little floor space; (e) a provision for accurately adjusting the alignment between the carton carriers and the carriers for the articles that are to be dropped into the cartons; and (f) a provision allowing a quick change-over between articles of different sizes.

These and other more detailed and specific objects will become apparent in view of the following specification and drawings wherein:

FIG. 5 is a partial plan view of the carton deforming cam in accordance with the invention.

Briefly, the present invention provides a carton loading apparatus that consists of a framework upon which two spaced apart parallel conveyor units are mounted. Spaced apart carriers are provided on both conveyors. The articles that are to be inserted in the cartons are loaded in the carriers of one conveyor but are supported upon the surface of a longitudinally extending fixed bar. The article carriers are related to the fixed bar such that the path taken by the carriers intersects that of the bar at a small angle with the article carrier being located laterally of the bar at the outlet of the apparatus. Cartons mounted on the lower conveyor are positioned in substantial vertical alignment with the carriers of the upper conveyor. In operation, the articles move laterally relative to the bar as they are transferred longitudinally and upon clearing the side edge of the bar each falls into the empty container beneath it.

To the accomplishment of the foregoing and related ends the invention then comprises the features hereinafter fully described and particularly pointed out in the claims, the following description setting forth in detail certain illustrative embodiments of the inventon, these being indicative, however, of but a few of the various ways in which the principles of the invention may be employed.

Figure 1:
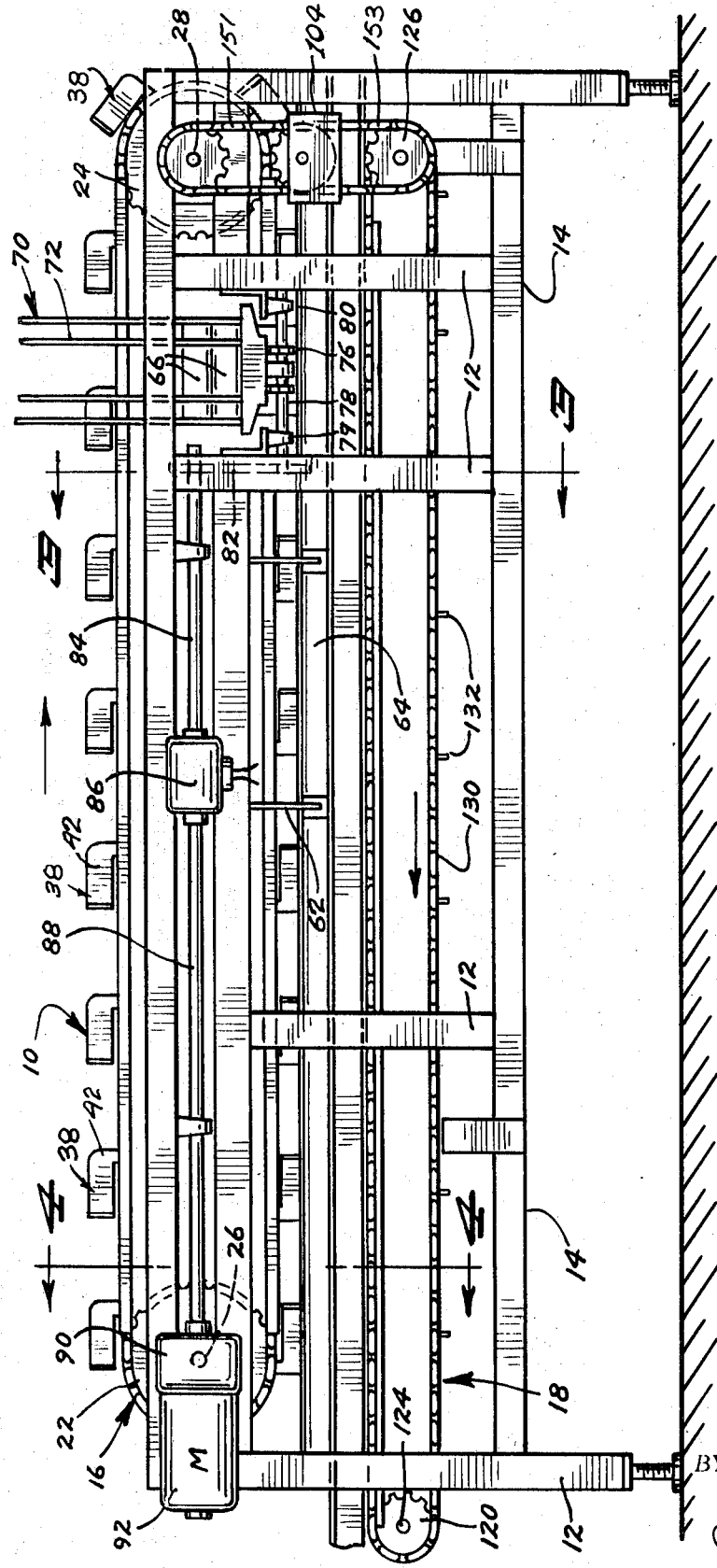
FIG. 1 is a side elevational view of the invention.
Figure 2:
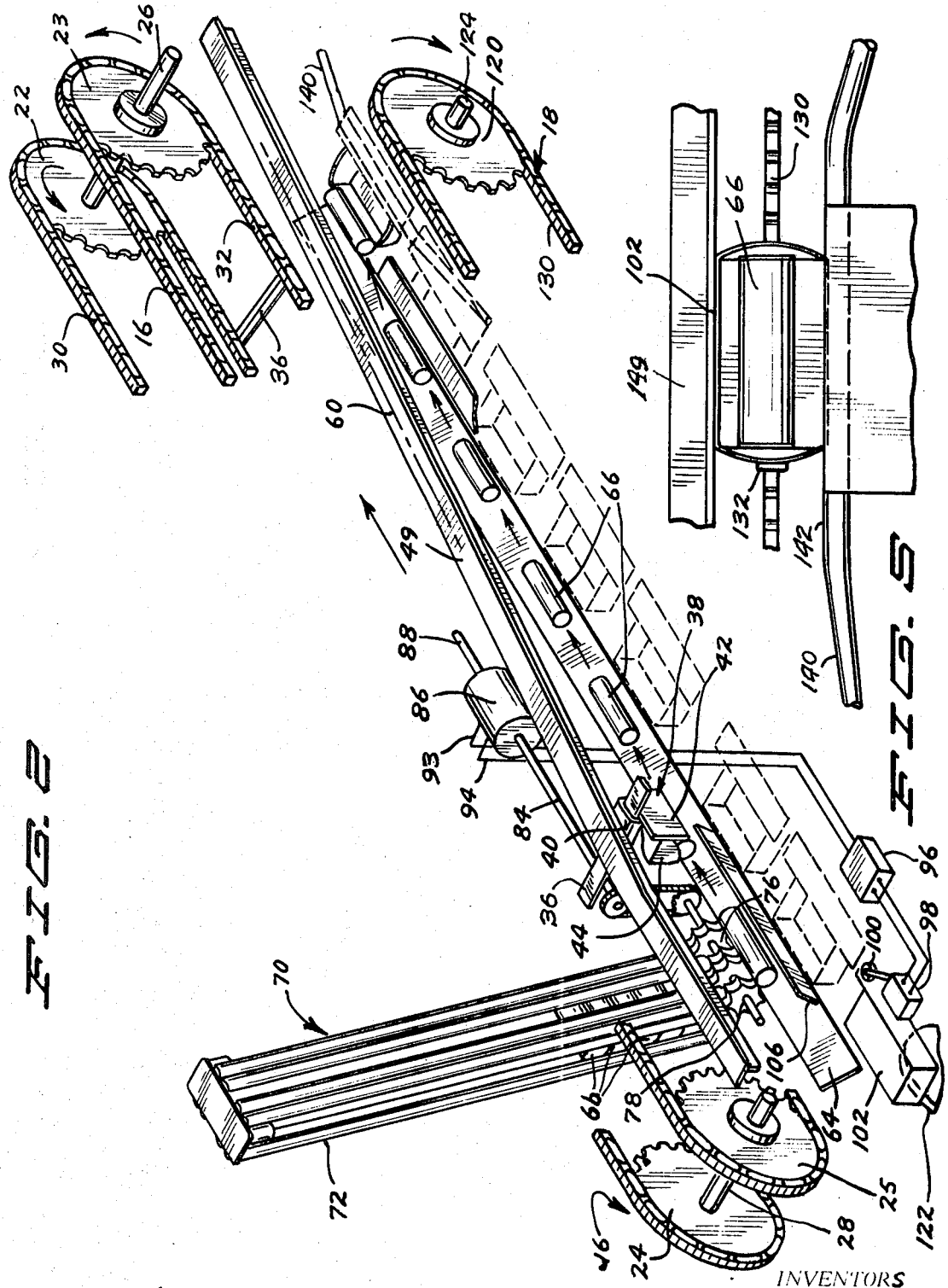
FIG. 2 is a semi-diagrammatic perspective view of the invention illustrating the principle operation.

Refer first to FIG. 1 and 2 which illustrate a loading apparatus 10 embodying the present invention. The apparatus 10 consists of a supporting framework composed of columns 12 and horizontal members 14 suitably connected as by welding. Mounted uon the supporting framework are two longitudinally extending vertically aligned endless chain conveyors indicated generally at 16 and 18.

The upper conveyor 16 includes two vertically disposed drive sprockets 22 and 23 at one end of the apparatus and a pair of laterally spaced sprockets 24 and 25 at the other end. The sprockets are mounted upon longitudinally spaced horizontally disposed and laterally extending shafts 26 and 28 respectively, suitably journalled for rotation on the framework. Entrained over corresponding pairs of sprockets are endless conveyor elements consisting of roller chains 30. and 32.

Figure 3:
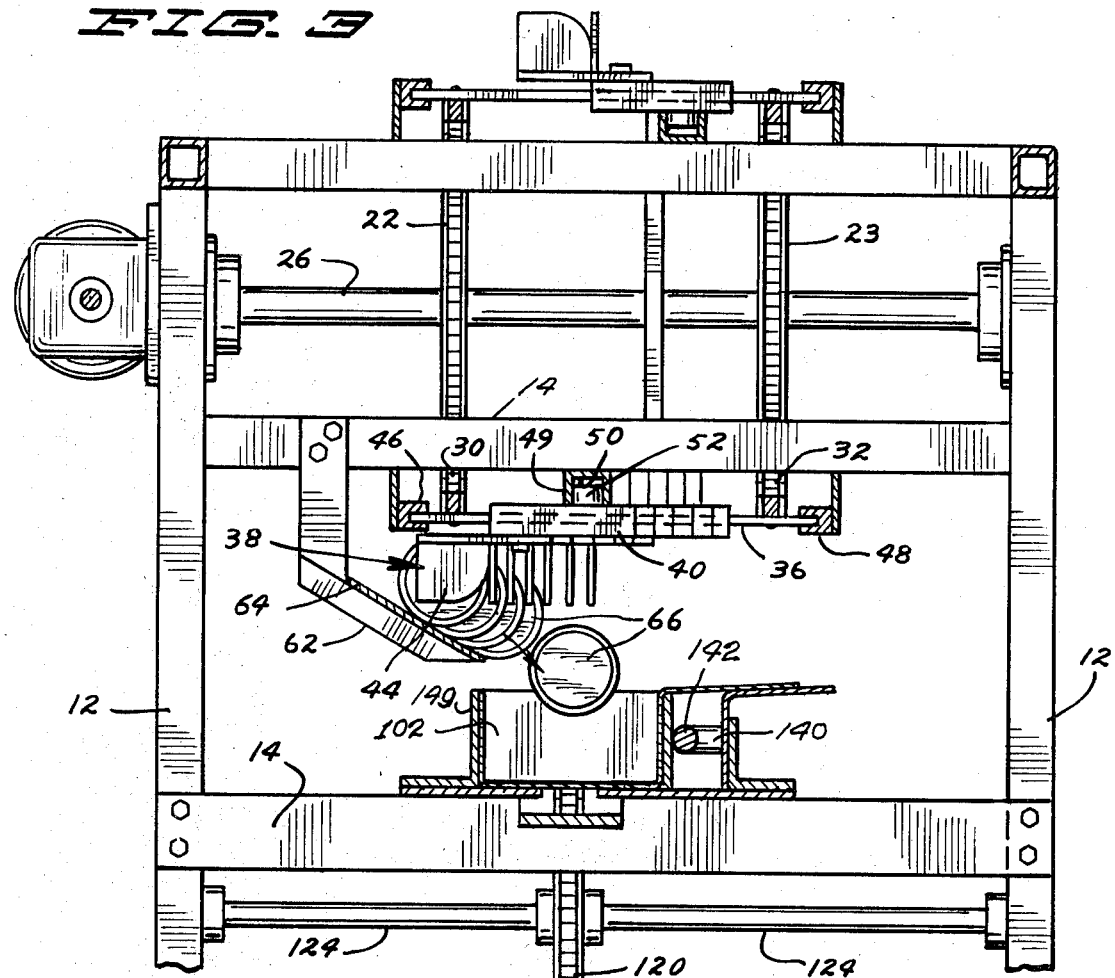
FIG. 3 is a vertical sectional view taken on line 3—3 of FIG. 1.
Figure 4:
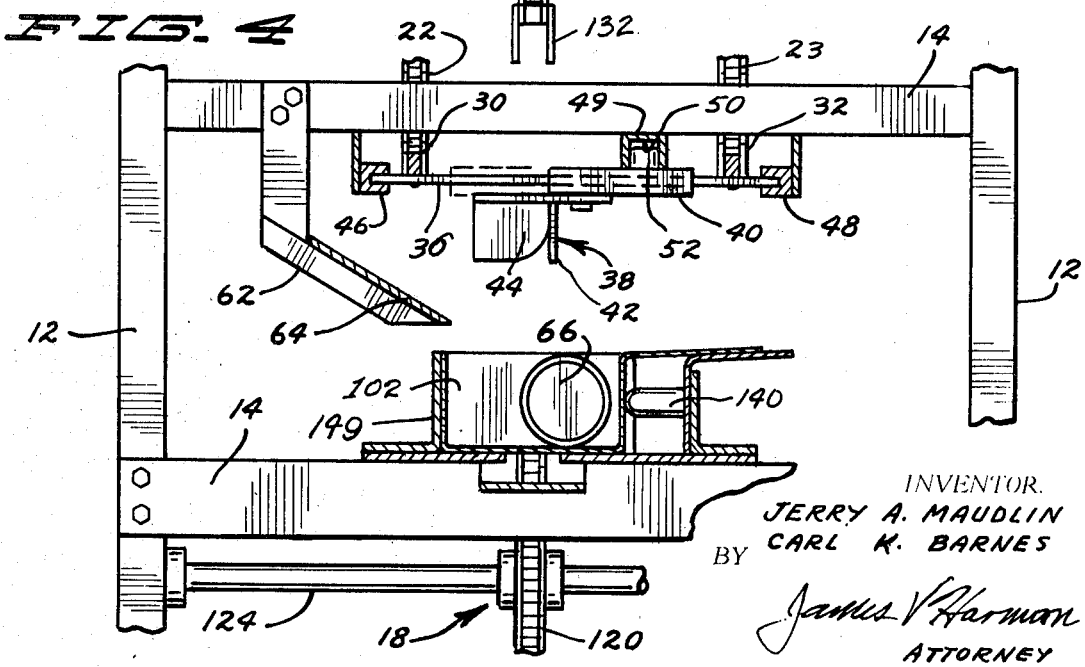
FIG. 4 is a transverse sectional view taken on line 4—4 of FIG. 1.

Secured between the chains 30 and 32 are a plurality of longitudinally spaced transversely disposed carrier support bars 36 (FIGS. 2, 3 and 4). The ends of the bars are mounted for sliding movement within longitudinally extending parallel guides or rails 46 and 48. An article carrier 38 depends from a sleeve 40 which is mounted for lateral sliding movement upon each of the carrier support bars 36. Each carrier 38 is composed of a longitudinally extending vertically disposed side plate 42 and a transversely disposed end plate 44 positioned in alignment with the trailing edge of the plate 42.

As seen in FIGS. 2, 3 and 4, an elongated longitudinally extending cam rail 49 which has a generally U-shaped cross section with a downwardly opening recess 50 is rigidly supported upon one of the cross members 14 of the framework. A follower 52 extends upwardly from each of the sleeves 40 into the recess 50 of the cam 49. During operation, the followers 52 and in turn the sleeves 40 are moved laterally by the cam 49.

As best seen in FIG. 2, the center portion of the cam 49 extends along an axis 60 which is positioned within a horizontal plane but intersects the longitudinal axis of the conveyors 16 and 18 at a slight angle thereby moving the sleeves 40 and the carriers 38 from left to right as seen in FIGS. 2, 3 and 4 as the conveyor 16 advances the carriers through the apparatus.

Secured upon the framework upon longitudinally spaced brackets 62 (FIGS. 3 and 4) is a longitudinally extending inclined article supporting bar 64. During operation the articles that are being loaded, e.g. cans 66, slide upon and obtain support from the inclined bar 64. When the outlet end of the machine is reached, the cam 49 forces the follower 52 and carrier 38 toward the right in the figures thereby allowing each can 66 to fall as it clears the side of the bar 64 from the supported position into a carton 102.

The feed mechanism employed for supplying cans to the inlet end of the apparatus will now be described in connection with FIGS. 1 and 2.

The feed mechanism indicated generally at 70 comprises an almost vertical magazine 72 that holds a supply of cans 66. The cans fall by gravity toward the inlet of the apparatus 10. The lower end of the magazine 72 is located immediately above a star wheel 76 that is mounted for rotation upon a support shaft 78 journalled within bearings 79 and 80 (FIG. 1). The shaft 78 is connected by means of a chain 82 to a shaft 84 which is coupled through an electric clutch 86 and shaft 88 to a gear box 90 in turn driven by means of a motor 92. The magnetic clutch 86 is connected by conductors 93 and 94 through a time delay mechanism 96 to a limit switch 98 having a switch lever 100 positioned to sense the presence of a carton 102 as it enters the machine.

During operation, periodic actuation of the limit switch 98 acting through time delay 96 will periodically energize and thus engage the clutch 86. The rotation of the clutch 86, shaft 84 and shaft 78 will cause cans 66 to fall periodically onto the bar 64 where they are temporaily supported by an arresting bar 106 (FIG. 2). In the event one of the cartons happens to be missing, the lack of an impulse through time delay 96 will temporarily de-energize the magnetic clutch 86 and stop rotation of star wheel 76 thereby preventing a can 66 from being dropped at the locating on conveyor 18 where the carton is missing.

The carton conveyor 18 will now be described in connection with FIGS. 1, 3 and 4. The conveyor 18 consists of a pair of vertically disposed longitudinally spaced conveyor sprockets 120 and 122 supported by horizontally disposed transversely extending shafts 124 and 126 respectively. The shafts 124 and 126 are suitably journalled on the supporting framework. Entrained over sprockets 120 and 122 is an endless chain conveyor element 130 having a plurality of longitudinally spaced carton advancing lugs 132 which engage the cartons 102 as they enter the machine at the left in FIG. 2 and advance them toward the outlet end at the right as seen in FIG. 2 in the same speed and direction as conveyor 16.

The lugs 132 and carriers 38 are carefully positioned relative to one another so that each can 66 is in exact vertical alignment with one of the cartons 102. Alignment is accomplished as seen in FIG. 1 by the provision of a manually controllable unit 104 of suitable known construction for changing the angular relationship (shaft angle) between an input chain 151 and an output chain 153 connecting the drive shaft 28 and the conveyor 18. Conveyor 16 is driven directly from gear box 90. Although the shaft angle adjustment mechanism may take various forms, one suitable unit is sold under the name Specon Phase Shifter Model #0–PSD–98 by the Fairchild Hiller Company.

The package compressing assembly will now be described with particular reference to FIGS. 3–5. As seen in FIG. 5 there is provided a carton abutment or supporting rail 149 positioned to hold the cartons against movement toward the rear in FIG. 2 (toward the left in FIGS. 3 and 4). Rigidly connected to the supporting framework immediately over sprocket 120 an elongated carton compressing rod 140 including a center section 142 is positioned sufficiently close to a guide rail 149 on the opposite side of the carton 102 to compress the side walls of the carton 102 centrally. This causes the front and rear walls of the carton 102 to bow outwardly thereby facilitating transfer of the article 66 into the carton 102 even though the articles 66 are precisely the same size as the length of the carton when measured from the inside.

In operation, it will be understood that the cartons as they travel from left to right in FIG. 2 pass between the compressing rod 140 and the rail 149 as they are engaged thereby until the front and rear ends of the carton bow outwardly. It it as this point that each article 66 clears the side edge of the supporting bar 64 and is dropped into the container 102. When each container passes out of the machine, the walls of the container return to their normal undeflected position.

A machine embodying the present invention proved to be highly reliable in filling cartons with cans having the same length as the inside long dimension of the carton at rates as high as 250 cans per minute. In the event a carton is missing at the loading station no can will be placed in the corresponding carrier 38. In the event a change-over is required in cans of one size to cans of a different size (for example) with shorter cans it is only necessary to remove the magazine 72 and replace it with a magazine of the proper size to accommodate the articles to be loaded. It should be noted that the star wheel 76 and the carriers 38 will accommodate articles of any length. Accordingly, no change in either the star wheel or carrier 38 is required when the article size is changed.

It is apparent that many modifications and variations of this invention as hereinbefore set forth may be made without departing from the spirit and scope thereof. The specific embodiments described are given by way of example only and the invention is limited only by the terms of the appended claims.

We claim:

1. A carton loading apparatus comprising means for conveying a plurality of articles to be loaded along a predetermined path, a means for conveying a plurality of said cartons along a path positioned beneath the path taken by the article to be loaded, an elongated bar for supporting the article to be loaded and means operatively associated between the bar and the upper conveying means for causing the article to slide laterally past the side edge of the bar and thereafter fall by gravity into one of said cartons, the upper conveyor comprises an endless conveyor means including at least a pair of vertically disposed longitudinally spaced sprockets in a flexible endless conveyor element entrained over the sprockets and carriers spaced longitudinally from one another on the endless conveyor element, the carriers each have a vertically disposed longitudinally extending side wall and a vertically disposed transversely extending rear wall positioned to engage the rearward end of the article that is to be loaded.

2. A carton loading apparatus comprising means for conveying a plurality of articles to be loaded along a predetermined path, a means for conveying a plurality of said cartons along a path positioned beneath the path taken by the article to be loaded, an elongated bar for supporting the article to be loaded and means operatively associated between the bar and the upper conveying means for causing the article to slide laterally past the side edge of the bar and thereafter fall by gravity into one of said cartons, a compressing means is operatively associated with the carton conveyor for deforming each carton by inward pressure upon side walls thereof to thereby cause the front and rear walls of the container to bow outwardly.

3. A carton loading apparatus comprising means for conveying a plurality of articles to be loaded along a predetermined path, a means for conveying a plurality of said cartons along a path positioned beneath the path taken by the article to be loaded, an elongated bar for supporting the article to be loaded and means operatively associated between the bar and the upper conveying means for causing the article to slide laterally past the side edge of the bar and thereafter fall by gravity into one of said cartons, said conveying means for the articles that are to be loaded includes a plurality of transversely extending carrier support elements, followers mounted for lateral sliding movement on the carrier support elements, cam means rigidly mounted on the apparatus in sliding contact with the article carriers for moving the followers and article carriers laterally as they pass longitudinally through the apparatus to transfer the carriers to a position in which the articles therein clear the side edge of the support bar before the outlet end of the machine is reached to cause each successive article to fall into one of the cartons.

4. A carton loading apparatus comprising means for conveying a plurality of articles to be loaded along a predetermined path, a means for conveying a plurality of said cartons along a path positioned beneath the path taken by the article to be loaded, an elongated bar for supporting the article to be loaded and means operatively associated between the bar and the upper conveying means for causing the article to slide laterally past the side edge of the bar and thereafter fall by gravity into one of said cartons, a sensing means is positioned to engage each successive carton as it enters the machine and a drive means is operatively connected with the sensing means for transferring one of the articles to a position engageable by one of the article carriers only if the sensing means is actuated.

5. A carton loading apparatus comprising means for conveying a plurality of articles to be loaded along a predetermined path, a means for conveying a plurality of said cartons along a path positioned beneath the path taken by the article to be loaded, an elongated bar for supporting the article to be loaded and means operatively associated between the bar and the upper conveying means for causing the article to slide laterally past the side edge of the bar and thereafter fall by gravity into one of said cartons, the upper conveyor comprises an endless conveyor means including at least a pair of vertically disposed longitudinally spaced sprockets in a flexible endless conveyor element entrained over the sprockets and carriers spaced longitudinally from one another on the endless conveyor element, the upper conveyor comprises a pair of parallel longitudinally extending endless chain conveyors mounted in lateral spaced relationship, bars are connected to extend laterally between the chains of said chain conveyors, followers mounted on each of the bars connected between the chains and each article carrier is mounted on one of the followers, a cam extends longitudinally of the apparatus and is engaged by the follower, said cam being positioned to slide each successive article carrier laterally away from the supporting bar as it travels longitudinally through the apparatus towards the outlet end thereof.

6. A method for filling a carton with an article that is of a size which fits into the carton with little or no room to spare between its edges and first and second opposed walls of said carton comprising; providing conveying means for advancing the carton and the article along spaced paths, supporting the article just about the carton, simultaneously advancing the carton and the article in the same direction and at the same speed, allowing the article to fall under the influence of gravity while the article and carton are being thus advanced with the article being at all times maintained longitudinally aligned with the carton and compressing the opposed side walls of the carton toward one another to cause the first and second side walls of the carton to bow outwardly just before the article is allowed to fall into the carton to thereby facilitate introduction of the article into the carton.

References Cited
UNITED STATES PATENTS 3,121,300   2/1964   Rossi _____ 53—50
3,377,774   4/1968   Nigrelli et al. _____ 53—250

TRAVIS S. McGEHEE, Primary Examiner

U.S. Cl. X.R.

53—63, 251